United States Patent Office 2,718,536
Patented Sept. 20, 1955

2,718,536

MANUFACTURE OF RUBBER ARTICLES

Frederick Arthur Jones, Castle Bromwich, Birmingham, England, assignor to Dunlop Rubber Company Limited, London, England, a British company No Drawing. Application February 21, 1951,
Serial No. 212,196

Claims priority, application Great Britain March 7, 1950

13 Claims. (Cl. 260—793)

This invention relates to improvements in the manufacture of rubber articles from latex.

In making rubber articles from latex, the latex is compounded with a gelling agent and vulcanising agents, including sulphur and a vulcanisation accelerator, and after shaping the latex, e. g. by dipping, spreading, extruding, or frothing and pouring the froth into moulds, gelling and vulcanisation are effected. Generally ultra-accelerators are used, for example metal alkylxanthates or salts of N-substituted dithiocarbamic acid in which the substituents are hydrocarbon radicals. Such ultra-accelerators enable vulcanisation to be effected at a temperature of 100° C. or below, and steam or hot water can then be used as the heating medium. After the sulphur and accelerators have been added the latex is frequently allowed to mature before adding the gelling agents, i. e. it is left for several hours during which time a change of an undetermined nature occurs whereby vulcanisation will take place more rapidly when the latex is subsequently heated to vulcanising temperature.

Accelerators differ not only in the degree to which they accelerate vulcanisation but in such factors as their stability, and their ability to thicken the latex or to cause flocculation; sometimes mixtures of two accelerators are used, the two being added at the same time or at different stages of the process in amounts such that each exerts an accelerating effect on the vulcanisation; it is thus possible to minimize disadvantageous changes in the mix such as, for example thickening, flocculation, or premature vulcanisation, one or more of which might occur if, instead of mixing two appropriately selected accelerators, a larger amount of one of them were added.

It has been proposed to use as a vulcanisation accelerator for rubber latex sodium isopropyl xanthate in conjunction with diethylammonium diethyl dithiocarbamate or sodium diethyl dithiocarbamate, the proportions specifically mentioned being equal quantities of sodium isopropyl xanthate and sodium diethyl dithiocarbamate or 2 parts by weight of sodium isopropyl xanthate for every 3 parts by weight diethylammonium diethyl dithiocarbamate. This high proportion of xanthate in the accelerator gives rise to objectionable thickening of the latex.

It has now been found that a fast cure can be obtained when using a dithiocarbamate as accelerator without causing an undesirable amount of thickening by incorporating a metal alkyl xanthate in the latex during compounding in an amount of from 1% to 20% by weight of the dithiocarbamate.

The proportion of xanthate to latex which is effective in materially reducing the time of vulcanisation is substantially smaller than has been used hitherto, and is insufficient by itself to effect vulcanisation at a technically useful rate, but results in a considerable increase in the rate at which the dithiocarbamate vulcanises a given compounded latex. The advantage is thus gained of accelerating the vulcanisation process without an undesirable amount of thickening of the latex.

It has also been found that the presence of the xanthate enables the saturation time to be considerably reduced or even eliminated. Because of the activator effect of the xanthate it is possible to reduce the time necessary for full vulcanisation of soft vulcanized rubber articles produced directly from rubber latex, i. e. the time necessary to cause most of the sulphur to combine with the rubber, or to modify the composition of the latex mixing so that with the same vulcanisation time a superior product is obtained. In particular the latex can be compounded with a smaller amount of sulphur and, other variables being unaltered, an article with a higher elongation at break and also better ageing properties can be obtained.

According to the present invention, therefore, a process for the production of rubber articles comprises compounding a rubber latex with sulphur, a vulcanisation accelerator comprising a salt of a N-substituted dithiocarbamic acid and 1 part to 20 parts by weight of a salt of an alkyl xanthate for every 100 parts by weight of the dithiocarbamate, adding a gelling agent to the compounded latex, shaping and gelling the compounded latex, and then vulcanising the rubber.

Preferably a metal salt of a N-substituted dithiocarbamate acid is used which is water-insoluble, as no appreciable amount of it is then lost to the aqueous portion of the rubber latex and also as any thickening of the latex due to the dithiocarbamate is then minimised or avoided. The accelerator may also be a mixture of a dithiocarbamate and another accelerator (as well as the xanthate), e. g. a thiazole such as mercaptobenzthiazole.

Preferably salts of alkyl xanthates which are water-soluble are used as activators, in particular the alkali metal and ammonium salts, for example sodium isopropyl xanthate or potassium isopropyl xanthate, since they do not require dispersion in water prior to addition to the latex and they cause less thickening of the latex than xanthates insoluble in water; however, xanthates which are insoluble in water, e. g. zinc isopropyl xanthate, may also be used.

Water-insoluble dithiocarbamates which may be used include the zinc salts e. g. zinc pentamethylene dithiocarbamate, zinc phenylmethyl dithiocarbamate and zinc lupetidine dithiocarbamate (also known as zinc lupetidine carbothionolate); selenium diethyl dithiocarbamate may also be used. Although water-insoluble dithiocarbamates are preferred water-soluble dithiocarbamates may be employed, e. g. sodium pentamethylene dithiocarbamate, sodium dimethyl dithiocarbamate and sodium dibutyl dithiocarbamate.

A compounded rubber latex particularly suitable for use in this invention is one which contains 40% to 65% by weight of rubber solids and for every 100 parts by weight of rubber 1.5 to 3.5 parts by weight of sulphur, 0.25 to 10 parts by weight zinc oxide, 0.5 to 2 parts by weight of accelerator including dithiocarbamate and an amount of a salt of an alkyl xanthate corresponding to 5% to 20% by weight of the dithiocarbamate in the accelerator. If the accelerator or the activator is soluble in water it may be added to the latex during compounding as an aqueous solution or, if insoluble, as an aqueous dispersion.

In one method of making rubber sheet according to the invention, a rubber latex is mixed with aqueous dispersions of sulphur and of zinc oxide respectively. An aqueous dispersion of a water-insoluble dithiocarbamate accelerator, e. g. zinc diethyl dithiocarbamate, is then added and also an aqueous solution of sodium isopropyl xanthate, the amount of the xanthate corresponding to approximately 10% by weight of the zinc diethyl dithiocarbamate. The latex compounded as above is stirred to disperse the solids uniformly and then sodium silicofluoride is added as gelling agent in the form of an aqueous dispersion containing 0.25 to 5 parts by weight of sodium silicofluoride for every 100 parts by weight of rubber in the latex. The compounded latex is poured into a shallow mould while still mobile and allowed to gel and the sheet of gelled compounded rubber is then vulcanised by means of steam or hot water, and then dried.

The invention may be applied to the production of rubber goods of any kind from rubber latex, but it is particularly useful in the production of soft vulcanised rubber sheeting, dipped goods and especially of sponge rubber goods.

The following examples illustrate the invention, all parts being by weight.

*Example 1*

200 parts of a concentrated natural rubber latex containing 120 parts of rubber were mixed with 14.4 parts of an aqueous dispersion of sulphur containing 25% of sulphur and 14.4 parts of an aqueous dispersion of zinc oxide containing 25% of zinc oxide; the mixture was stirred for 15 minutes at 20° C. to ensure proper mixing and 4.32 parts of a 25% aqueous dispersion of zinc diethyl dithiocarbamate and also 0.48 part of a 25% aqueous solution of sodium isopropyl- xanthate were then added and the mixture was again stirred for 15 minutes and diluted with 15 parts of distilled water. The mixture was cooled to 16° C. and 8 parts of a 10% aqueous dispersion of sodium silicofluoride added. After stirring the compounded latex for a brief time a number of shallow moulds were filled with the latex, thus casting the latex into sheets 2 mm. thick; the filled moulds were set aside for 90 minutes at room temperature to permit the latex to gel.

The wet gelled rubber sheets were removed from the moulds and vulcanised by heating in boiling water for various periods and were then rapidly cooled by immersion in a large volume of cold water to prevent further vulcanisation; the rubber sheets were then cut into pieces of suitable size for testing and dried at room temperature. The permanent set of the specimens vulcanised for various periods of time at 100° C. was determined by stretching each under a load of 1,000 grm. for 30 minutes, removing the load and allowing the pieces to recover for one hour at 20° C. before measuring the alteration in length. The specimen which gave the minimum permanent set determined as above, had been vulcanised for 3 minutes.

Test pieces were made in a similar way from a rubber latex mix of the same composition except that it contained 4.8 parts of a 25% dispersion of zinc diethyl dithiocarbamate instead of the mixture of dithiocarbamate and xanthate. The vulcanisation time at 100° C. of the specimen giving minimum permanent set as above was 15 minutes.

It will be seen from a comparison of the above results that the gel containing the xanthate was similarly vulcanised in one-fifth of the time required for vulcanising a gel containing the dithiocarbamate without any xanthate.

*Example 2*

Using the procedure described in the foregoing example, rubber sheets were prepared from a compounded rubber latex containing 0.1% of zinc isopropyl xanthate instead of the sodium isopropyl xanthate but otherwise of the same composition, the zinc salt being added as an aqueous dispersion. The vulcanisation time at 100° C. was 3 minutes.

Comparison with the control tests of Example 1 shows that the mixing containing the zinc isopropyl xanthate was vulcanised in a fifth of the time required for vulcanisation with zinc diethyl dithiocarbamate alone.

*Example 3*

Using the method of Example 1 a rubber latex mixing (containing 60% rubber solids) was made of the following equivalent dry solids composition:

| | Parts |
|---|---|
| Rubber | 100 |
| Sulphur | 3.0 |
| Zinc diethyl dithiocarbamate | 0.60 |
| Mercaptobenzthiazole | 0.80 |
| Sodium isopropyl xanthate | 0.10 |
| Zinc oxide | 3.00 |

Sheets made from this mixing were gelled and vulcanised in boiling water for various times and the vulcanisation time was measured as in Example 1 and found to be 1½ minutes.

A similar mix was made in which the sodium isopropyl xanthate was omitted, the remainder of the accelerator being as before, and sheets of this mix were vulcanised in hot water at 100° C.; the vulcanisation time was measured as before and found to be 3 minutes.

The sodium isopropyl xanthate was thus effective in increasing the rate of vulcanisation of even a rapid mixed accelerator such as zinc diethyl dithiocarbamate and mercaptobenzthiazole.

A third mix was made of the above composition but without the alkyl xanthate, and the mix allowed to mature at 20° C. for 28 hours before adding the sodium silicofluoride, shaping, gelling and vulcanising. The vulcanisation time of the matured composition determined as before, was 1½ minutes.

The inclusion of sodium isopropyl xanthate in the unmatured mix thus reduced the vulcanisation time in the same proportion as maturing under the above conditions the mix not containing xanthate.

*Example 4*

42 parts of a dispersion of sulphur (containing 25% sulphur), 72 parts of a dispersion of zinc oxide (containing 25% of zinc oxide), 21.6 parts of a 25% dispersion of zinc diethyl dithiocarbamate, and 4 parts of 25% aqueous solution of sodium isopropyl xanthate were all added to 1000 parts of concentrated natural rubber latex (containing the equivalent of 600 parts of dry rubber). An aqueous solution containing the equivalent of 5 parts of sodium ricinoleate was added to this mixing after well stirring, and the mixing beaten with air in a frothing machine for five minutes. 20 parts of a 10% dispersion of sodium silicofluoride were added to the mobile foam and after short mixing the foam was poured into an aluminium mould and allowed to stand for about twenty minutes. On heating the mould in boiling water at 100° C., a satisfactorily cured foam sponge was obtained.

Having described my invention, what I claim is:

1. A process for the production of rubber articles which comprises forming a heat-vulcanizable natural rubber latex mix containing sulphur, a N-substituted dithiocarbamate vulcanization accelerator and as an activator therefor a metal alkyl xanthate vulcanization accelerator in amount from 1 part to 20 parts by weight of the metal alkyl xanthate for every 100 parts by weight of the dithiocarbamate, adding a natural rubber latex gelling agent to the mix, shaping and gelling the mix and then vulcanizing the rubber.

2. A process according to claim 1 in which the N-substituted dithiocarbamate vulcanization accelerator is insoluble in water.

3. A process according to claim 1 in which the metal alkyl xanthate is a water-soluble salt selected from the group consisting of the ammonium and alkali metal alkyl xanthates.

4. A process for the production of rubber articles which comprises forming a heat-vulcanizable natural rubber latex mix containing sulphur, an N-substituted dithiocarbamate vulcanization accelerator in which the substituents on the nitrogen are hydrocarbon radicals with less than seven carbon atoms, and as an activator therefor a metal lower alkyl xanthate vulcanization accelerator in amount from 1 part to 20 parts by weight of the metal lower alkyl xanthate for every 100 parts by weight of the dithiocarbamate, adding a natural rubber latex gelling agent to the mix, shaping and gelling the mix and then vulcanizing the rubber.

5. A process according to claim 4 in which the N-substituted dithiocarbamate vulcanization accelerator is insoluble in water.

6. A process according to claim 5 in which the N-substituted dithiocarbamate vulcanization accelerator is selected from the group consisting of zinc pentamethylene dithiocarbamate, zinc phenylmethyl dithiocarbamate, and zinc lupetidine dithiocarbamate.

7. A process according to claim 4 in which the metal alkyl xanthate is a water-soluble salt selected from the group consisting of the ammonium and alkali metal xanthates.

8. A process according to claim 7 in which the metal alkyl xanthate is an alkali metal isopropyl xanthate.

9. A process for the production of rubber articles which comprises forming a heat-vulcanizable natural rubber latex mix containing 40% to 65% by weight of rubber solids and for every 100 parts by weight of rubber 1.3 to 3.5 parts of sulphur, 0.25 to 1.0 parts of zinc oxide, 0.5 to 2 parts by weight of an N-substituted dithiocarbamate vulcanization accelerator and 5% to 20% by weight of a metal alkyl xanthate vulcanization accelerator based on the weight of dithiocarbamate in the mix, adding a natural rubber latex gelling agent to the mix, shaping and gelling the mix and vulcanizing the rubber.

10. A process according to claim 9 in which the N-substituted dithiocarbamate accelerator is selected from the group consisting of zinc pentamethylene dithiocarbamate, zinc phenylmethyl dithiocarbamate and zinc lupetidene dithiocarbamate and the metal alkyl xanthate vulcanization accelerator as an alkali metal isopropyl xanthate.

11. The process of claim 1 in which the N-substituted dithiocarbamate is diethyldithiocarbamate and in which the metal alkyl xanthate is an isopropyl xanthate.

12. The process of claim 4 in which the N-substituted dithiocarbamate is diethyldithiocarbamate and in which the metal alkyl xanthate is an isopropyl xanthate.

13. The process of claim 9 in which the N-substituted dithiocarbamate is diethyldithiocarbamate and in which the metal alkyl xanthate is an isopropyl xanthate.

References Cited in the file of this patent

UNITED STATES PATENTS

| | | |
|---|---|---|
| 2,042,104 | Kane | May 26, 1936 |
| 2,172,463 | Anderson | Sept. 12, 1939 |
| 2,370,044 | Keene et al. | Feb. 20, 1945 |

OTHER REFERENCES

"J. Soc. Chemical Industries" of March 6, 1925, pages 100T to 106T.

"India Rubber World" of June 1, 1935, page 50.